United States Patent [19]
Overby et al.

[11] Patent Number: 6,092,819
[45] Date of Patent: Jul. 25, 2000

[54] SUSPENSION SYSTEM

[75] Inventors: Jerry Overby, Sioux Falls, S. Dak.; Arnold J. Heron, Ajax, Canada

[73] Assignee: Timbren Industries Incorporated, Ajax, Canada

[21] Appl. No.: 09/182,552

[22] Filed: Oct. 29, 1998

[51] Int. Cl.[7] .............................. B60G 3/12; B60G 3/18; B60G 7/00
[52] U.S. Cl. .................................................. 280/124.153
[58] Field of Search ................ 280/124.157, 124.128, 280/124.153, 683, 685, 686, 687, 124.133, 124.136

[56] References Cited

U.S. PATENT DOCUMENTS

| | | | |
|---|---|---|---|
| D. 291,190 | 8/1987 | Davis . | |
| 2,814,480 | 11/1957 | Clark et al. | 267/256 |
| 3,220,746 | 11/1965 | Francis | 280/124 |
| 3,256,007 | 6/1966 | Hunsaker . | |
| 3,466,058 | 9/1969 | King . | |
| 3,713,663 | 1/1973 | Granning . | |
| 3,831,210 | 8/1974 | Ow . | |
| 4,256,326 | 3/1981 | Cantrell et al. | 280/683 |
| 4,344,643 | 8/1982 | Ray . | |
| 4,379,572 | 4/1983 | Hedenberg | 280/86.7 |
| 4,518,171 | 5/1985 | Hedenberg | 280/6.15 |
| 4,858,948 | 8/1989 | Raidel | 280/124 |
| 4,871,187 | 10/1989 | Schaible . | |
| 4,902,035 | 2/1990 | Raidel | 280/124 |
| 4,930,804 | 6/1990 | Tattermusch et al. . | |
| 5,114,178 | 5/1992 | Baxter | 280/124 |
| 5,286,052 | 2/1994 | Lukianov . | |
| 5,332,258 | 7/1994 | Buttner | 280/86.5 |
| 5,354,091 | 10/1994 | Baxter et al. | 280/683 |
| 5,364,114 | 11/1994 | Petersen . | |
| 5,505,482 | 4/1996 | VanDenberg | 280/86.5 |
| 5,513,874 | 5/1996 | Mori . | |
| 5,570,286 | 10/1996 | Margolis et al. . | |
| 5,649,719 | 7/1997 | Wallace et al. . | |
| 5,791,681 | 8/1998 | VanDenberg | 280/124 |

*Primary Examiner*—Brian L. Johnson
*Assistant Examiner*—Michael Britton

[57] ABSTRACT

A suspension system for wheeled vehicles, in particular, trailers and especially semi-trailers. The suspension system includes a platform with a top seat supported above an arcuate bottom saddle. The bottom saddle of the platform is designed for resting on an axle of a vehicle such that the top seat is positioned above the axle. Upper and lower pivot arms are provided each having a pair of opposite ends. A first end of each of the pivot arms is pivotally coupled to the platform. A hanger member has a top plate and a side brace downwardly extending from the top plate of the hanger member. The top plate of the hanger member has a proximal portion and a distal portion. The side brace of the hanger member is coupled to the proximal portion of the top plate. The top plate of the hanger member is positioned above the top seat of the platform. The top plate of the hanger member is designed for attachment to a support frame of a trailer. A second end of each of the pivot arms is pivotally coupled to the side brace. A biasing member is positioned between the top seat of the platform and the top plate of the hanger member. The biasing member biases the platform and the top plate of the hanger member away from one another in a generally vertical direction.

21 Claims, 4 Drawing Sheets

SUSPENSION SYSTEM

BACKGROUND OF THE INVENTION

1. Field of the Invention

The present invention relates to suspension systems for wheeled vehicles including trailers and more particularly pertains to a new suspension system for wheeled vehicles, in particular, trailers and especially semi-trailers.

2. Description of the Prior Art

The use of suspension systems for wheeled vehicles including trailers is known in the prior art. More specifically, suspension systems for wheeled vehicles including trailers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,570,286; U.S. Pat. No. 5,332,258; U.S. Pat. No. 4,379,572; U.S. Pat. No. 3,713,663; U.S. Pat. No. 4,858,948; U.S. Pat. No. 3,466,058; U.S. Pat. No. 5,364,114; U.S. Pat. No. 4,871,187; U.S. Pat. No. 3,831,210; U.S. Pat. No. 4,518,171; U.S. Pat. No. 5,114,178; U.S. Pat. No. 5,513,874; U.S. Pat. No. 4,344,643; U.S. Pat. No. 4,930,804; U.S. Pat. No. 5,649,719; U.S. Pat. No. 5,286,052; U.S. Pat. No. 3,220,746; U.S. Pat. No. 3,256,007; U.S. Pat. No. 4,560,150; U.S. Pat. No. 5,588,665; U.S. Pat. No. 3,713,665; U.S. Pat. No. 4,029,305; U.S. Pat. No. 4,650,166; U.S. Pat. No. 2,933,308; U.S. Pat. No. 4,783,096; U.S. Pat. No. 3,160,407; U.S. Pat. No. 4,807,858; U.S. Pat. No. 2,926,011; U.S. Pat. No. 4,493,481; U.S. Pat. No. 3,263,985; U.S. Pat. No. 5,791,637; U.S. Pat. No. 2,711,315; and U.S. Pat. No. 4,242,961.

SUMMARY OF THE INVENTION

In view of the foregoing disadvantages inherent in the known types of suspension systems for wheeled vehicles including trailers now present in the prior art, the present invention provides a new suspension system construction wherein the same can be utilized for wheeled vehicles, in particular, trailers and especially semi-trailers.

The general purpose of the present invention, which will be described subsequently in greater detail, is to provide a new suspension system apparatus and method which has many of the advantages of the suspension systems for wheeled vehicles including trailers mentioned heretofore and many novel features that result in a new suspension system which is not anticipated, rendered obvious, suggested, or even implied by any of the prior art suspension systems for wheeled vehicles including trailers, either alone or in any combination thereof.

To attain this, the present invention generally comprises a platform with a top seat supported above an arcuate bottom saddle. The bottom saddle of the platform is designed for resting on an axle of a vehicle such that the top seat is positioned above the axle. Upper and lower pivot arms are provided each having a pair of opposite ends. A first end of each of the pivot arms is pivotally coupled to the platform. A hanger member has a top plate and a side brace downwardly extending from the top plate of the hanger member. The top plate of the hanger member has a proximal portion and a distal portion. The side brace of the hanger member is coupled to the proximal portion of the top plate. The top plate of the hanger member is positioned above the top seat of the platform. The top plate of the hanger member is designed for attachment to a support frame of a trailer. A second end of each of the pivot arms is pivotally coupled to the side brace.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new suspension system apparatus and method which has many of the advantages of the suspension systems for wheeled vehicles including trailers mentioned heretofore and many novel features that result in a new suspension system which is not anticipated, rendered obvious, suggested, or even implied by any of the prior art suspension systems for wheeled vehicles including trailers, either alone or in any combination thereof.

It is another object of the present invention to provide a new suspension system which may be easily and efficiently manufactured and marketed.

It is a further object of the present invention to provide a new suspension system which is of a durable and reliable construction.

An even further object of the present invention is to provide a new suspension system which is susceptible of a low cost of manufacture with regard to both materials and labor, and which accordingly is then susceptible of low prices of sale to the consuming public, thereby making such suspension system economically available to the buying public.

Still yet another object of the present invention is to provide a new suspension system which provides in the apparatuses and methods of the prior art some of the advantages thereof, while simultaneously overcoming some of the disadvantages normally associated therewith.

Still another object of the present invention is to provide a new suspension system for wheeled vehicles, in particular, trailers and especially semi-trailers.

Yet another object of the present invention is to provide a new suspension system which includes a platform with a top seat supported above an arcuate bottom saddle. The bottom saddle of the platform is designed for resting on an axle of a vehicle such that the top seat is positioned above the axle. Upper and lower pivot arms are provided each having a pair of opposite ends. A first end of each of the pivot arms is pivotally coupled to the platform. A hanger member has a top plate and a side brace downwardly extending from the top plate of the hanger member. The top plate of the hanger member has a proximal portion and a distal portion. The side brace of the hanger member is coupled to the proximal portion of the top plate. The top plate of the hanger member is positioned above the top seat of the platform. The top plate of the hanger member is designed for attachment to a support frame of a trailer. A second end of each of the pivot arms is pivotally coupled to the side brace.

Still yet another object of the present invention is to provide a new suspension system that provides suspension to a trailer when loaded and unloaded including excellent roll stiffness and excellent lateral control even when unloaded.

Even still another object of the present invention is to provide a new suspension system that is lighter in weight than traditional leaf spring suspension systems for trailers and provides a better ride than traditional leaf spring suspension systems when not supporting a heavy load.

Still yet another object of the present invention is to provide a new suspension system that helps maintain a trailer in a horizontal position when braking to help keep the rear end of the trailer from rising up in comparison to the front end of the trailer when braking.

Even still another object of the present invention is to provide a new suspension system that occupies less space than traditional trailer suspension systems. This allows this suspension system to be easily installed in tight places such as in trailers with little axle clearance such as low-boy style flatbed trailers and trailers with tandem axles.

Still yet another object of the present invention is to provide a new suspension system that may be used with various sorts of biasing members including air bags, coil springs and compression springs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 8 thereof, a new suspension system embodying the principles and concepts of the present invention and generally designated by the reference numeral 10 will be described.

As best illustrated in FIGS. 1 through 8, the suspension system 10 generally comprises a platform 11 with a top seat 12 supported above an arcuate bottom saddle 13. The bottom saddle of the platform is designed for resting on an axle 18 of a vehicle such that the top seat is positioned above the axle. Upper and lower pivot arms 23,24 are provided each having a pair of opposite ends. A first end 25,27 of each of the pivot arms is pivotally coupled to the platform. A hanger member 29 has a top plate 30 and a side brace 31 downwardly extending from the top plate of the hanger member. The top plate of the hanger member has a proximal portion 32 and a distal portion 33. The side brace of the hanger member is coupled to the proximal portion of the top plate. The top plate of the hanger member is positioned above the top seat of the platform. The top plate of the hanger member is designed for attachment to a support frame 87 of a trailer. A second end 26,28 of each of the pivot arms is pivotally coupled to the side brace. A biasing member 54 is positioned between the top seat of the platform and the top plate of the hanger member. The biasing member biases the platform and the top plate of the hanger member away from one another in a generally vertical direction.

Figure 1:
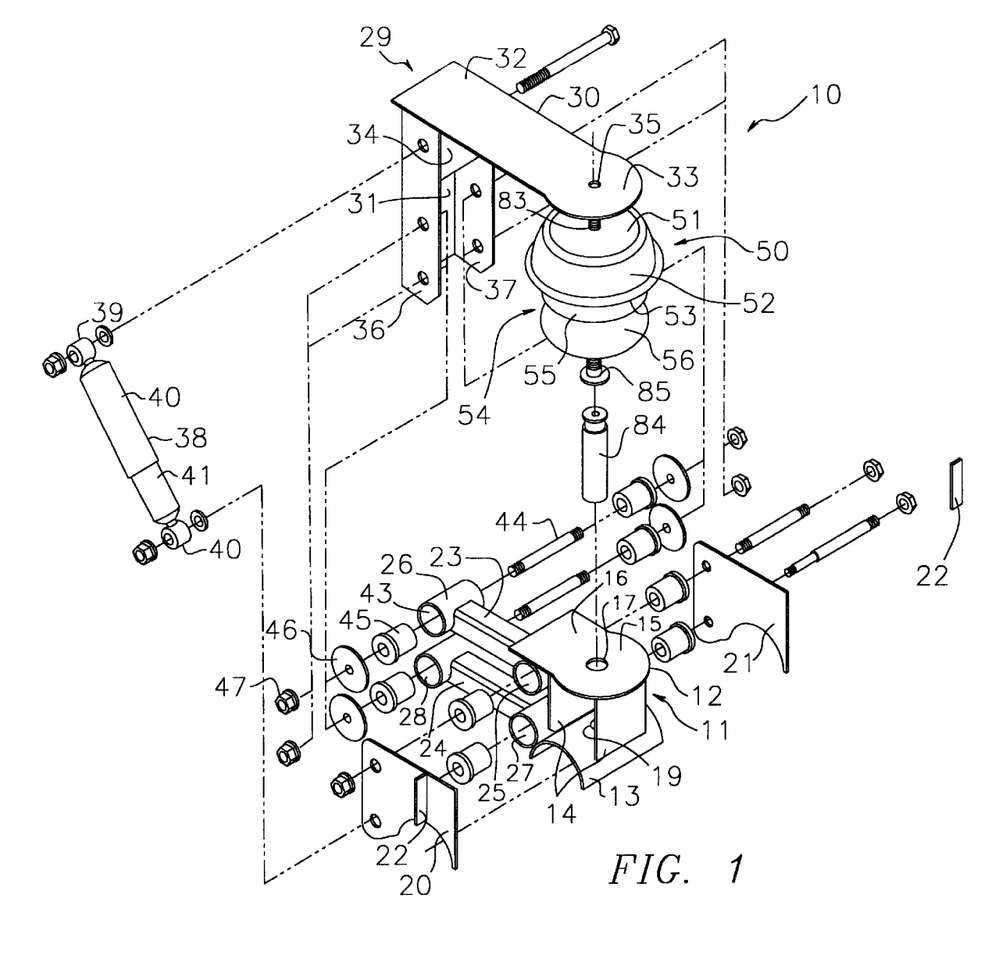
FIG. 1 is a schematic exploded perspective view of a new suspension system according to the present invention.
Figure 2:
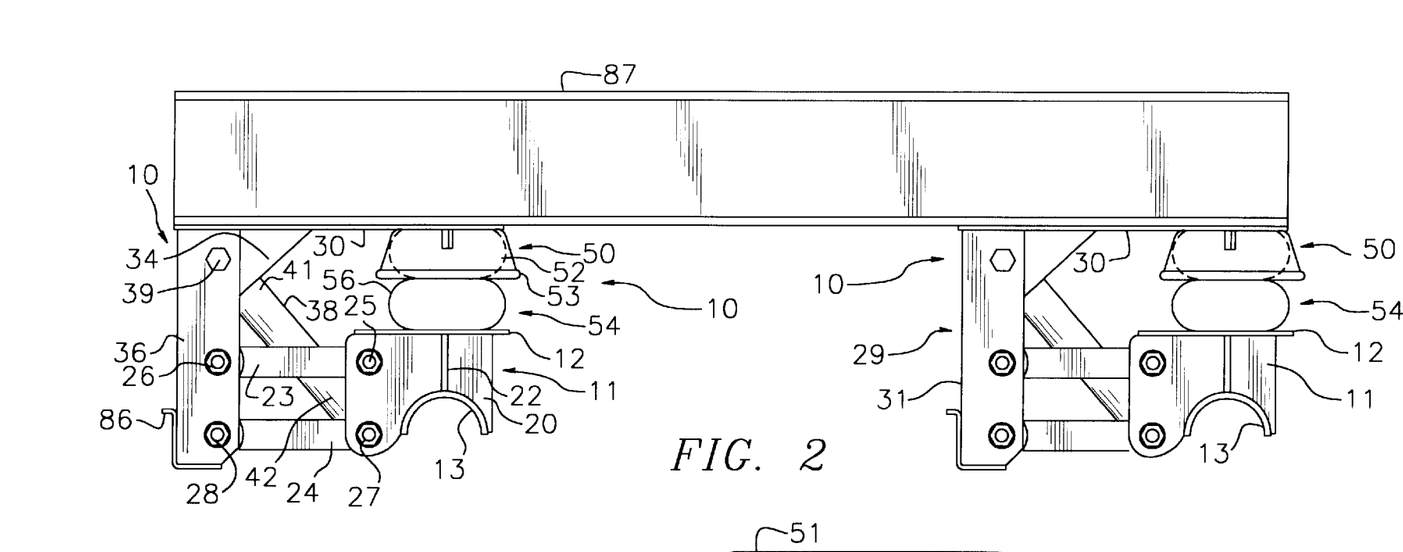
FIG. 2 is a schematic side view of a pair of the suspension system mounted in tandem to a support frame of a trailer.

In closer detail, the suspension system 10 comprises a platform 11 with a generally planar top seat 12 supported above an arcuate bottom saddle 13 by a pair of spaced apart generally vertical brace plates 14 coupled to the top seat and the bottom saddle. The top seat 12 of the platform has a generally circular portion 15 and a generally rectangular portion 16 outwardly extending from the circular portion of the top seat. The circular portion 15 of the top seat has a generally circular center hole 17 therethrough.

The bottom saddle 13 has a generally semi-circular transverse cross section. The bottom saddle of the platform is designed for resting on and coupling to an axle 18 of a vehicle such that the top seat is positioned above the axle and lies in a generally horizontal plane. The bottom saddle preferably has a generally circular vent hole 19 therethrough. The vent hole of the bottom saddle is preferably generally coaxial with the center hole of the top seat.

The platform 11 also has a spaced apart pair of generally parallel side plates 20,21 each coupled to the top seat and the bottom saddle of the platform. Preferably, each of the side plates has an outwardly extending generally rectangular side bracing 22. The side bracings of each of the side plates has a length generally vertically extending between the top seat and the bottom saddle of the plate. The side bracings of the side plates are designed for providing additional structural strength to the platform.

The suspension system also includes substantially parallel upper and lower pivot arms 23,24 each having a pair of opposite ends 25,26,27,28 and a longitudinal axis extending between the ends of the respective pivot arm. The upper and lower pivot arms are spaced apart from one another with the longitudinal axes of the pivot arms extending substantially parallel to one another. The upper and lower pivot arms each has a length defined between the ends of the respective pivot arm. Preferably, the lengths of the pivot arms is about or essentially equal to one another. In an ideal illustrative embodiment, the length of each of the pivot arms is about 9 inches. A first end 25,27 of each of the pivot arms is extended between the side plates of the platform and pivotally coupled to the side plates of the platform to permit pivoting of the pivot arms in a substantially vertical plane generally parallel to the side plates of the platform. The rectangular portion 16 of the top seat of the platform is positioned towards the first ends of the pivot arms.

The hanger member 29 has a substantially planar top plate 30 and a side brace 31 downwardly extending from the top plate of the hanger member. The top plate and the side brace of the hanger member preferably lie in generally perpendicular planes to one another. The top plate of the hanger member preferably has a generally rectangular proximal portion 32 and a generally circular distal portion 33. The side brace of the hanger member is coupled to the proximal portion of the top plate. Optionally, the hanger member may include a corner brace 34 coupled to the side brace and the proximal portion of the top plate to provide additional structure strength to the coupling between the side brace and the top plate. The distal portion of the top plate has a generally circular threaded center aperture 35 therethrough.

The top plate 30 of the hanger member is positioned above the top seat 12 of the platform with the distal portion 33 of the top plate and the circular portion 15 of the top seat generally coaxial with one another so that the center aperture of the top plate and the center hole of the top seat are generally coaxial with one another. In use, the top plate of the hanger member is designed for attachment to the bottom of a support frame 87 of a trailer such that the top plate of the hanger member lies in a generally horizontal plane and the side brace of the hanger member lies in a generally vertical plane (preferably with the side brace positioned in a direction towards the front of the trailer with respect to the platform). Preferably, the side walls of the side brace and the side plates of the platform generally lie in parallel planes to one another. Ideally, one side wall and one side plate generally lie in a common plane with one another and the other side wall and the other side plate generally lie in a common plane with one another.

The side brace has a spaced apart pair of side walls 36,37 extending therefrom in a direction towards the platform such that the side brace has a generally rectangular U-shaped transverse cross section taken from a generally vertical plane. A second end 26,28 of each of the pivot arms is extended between the side walls of the side brace and are pivotally coupled to the side walls of the side brace to permit pivoting of the pivot arms in a substantially vertical plane generally parallel to the side walls of the side brace. In use, the parallel pivotal relationship of the side arms to allow movement of the platform in relation to the hanger member up and down in a horizontal plane while limiting rotation of the platform with respect to the top plate as the pivot arms are pivoted so that the top seat of the platform and the top plate of the hanger member are maintained in generally parallel planes (preferably horizontal) to one another as the pivot arms are pivoted. The parallel pivot arms also help to limit movement of the platform in relation to the hanger member forwards and backwards in a vertical plane.

In a preferred embodiment, a telescopic fluidic piston cylinder actuator 38 is included having first and second ends 39,40, a cylinder portion 41, and a piston portion 42 telescopically inserted into the cylinder portion. The first end 39 of the telescopic fluidic piston cylinder actuator is pivotally coupled to one of the side walls of the side brace adjacent the top plate of the hanger member. The second end 40 of the telescopic fluidic piston cylinder actuator is pivotally coupled to one of the side plates of the platform. The telescopic fluidic piston cylinder actuator is designed for controlling the amount of up and down pivoting of the by the pivot arms and helping limit lateral movement of the pivot arms perpendicular to the longitudinal axes of the pivot arms in a vertical plane.

In an ideal illustrative embodiment, the side brace of the hanger member has a length defined downwards from the top plate of about 14.875 inches. In this ideal illustrative embodiment, the first end of the telescopic fluidic piston cylinder actuator is spaced apart from the second end of the upper pivot arm on the side brace about 5.413 inches. The second ends of the upper and lower pivot arms are preferably spaced apart on the side brace about 4.5 inches in this ideal illustrative embodiment.

Ideally, each of the pivotable couplings of the ends of the pivot arms comprises a generally cylindrical sleeve 43 coupled to the end of the pivot arms and a pivot pin 44 extended through the sleeve. The pivot pin has a pair of threaded ends outwardly extending in opposite directions from the sleeve. A pair of bushings 45 are provided with one of the bushings inserted in each end of the sleeve so that each end of the pivot pin is extended through an associated bushing. A washer 46 is disposed around each end of the pivot pin and a nut 47 is threaded onto each end of the pivot pin so that each washer is interposed between a nut and the associated bushing.

Figure 4:
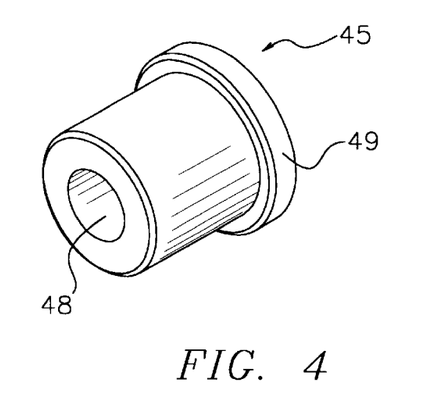
FIG. 4 is a schematic perspective view of a bushing of the present invention.
Figure 5:
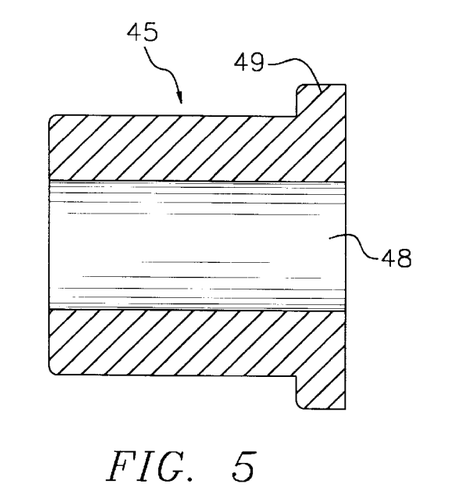
FIG. 5 is a schematic cross sectional view of a bushing of the present invention.

Preferably, each bushing 45 is generally cylindrical and has a bore 48 therethrough between opposite ends of the bushing. One of the ends of the bushing has an outwardly radiating annular flange 49 which abuts the associated end of the respective sleeve. In an ideal illustrative embodiment, the bushing has a length defined between the ends of the bushing of about 2.250 inches and a diameter of about 2 inches while the bore of the busing has a diameter of about 1 inch. In this ideal illustrative embodiment, the annular flange of the bushing preferably has a diameter of about 2.5 inches and a thickness defined parallel to the length of the bushing of about 0.312 inches.

Figure 8:
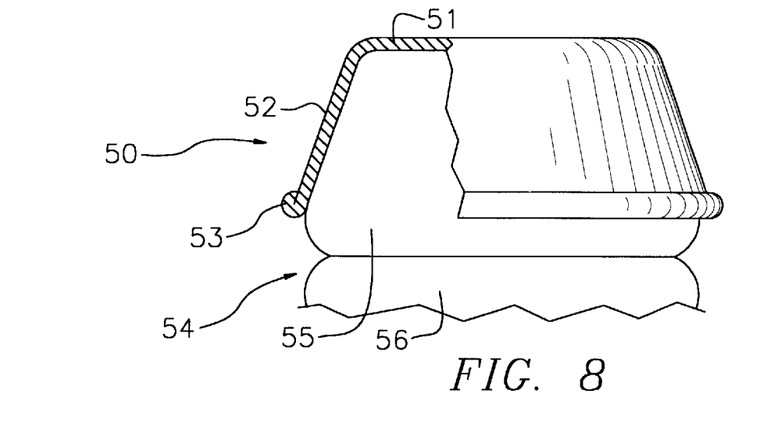
FIG. 8 is a schematic partial break-away view of the cup of the present invention.

Optionally, an inverted cup 50 is also preferably provided with a generally circular upper portion 51 and a perimeter side wall 52 downwardly extending around the upper portion of the cup. The perimeter side wall 52 of the cup terminates at a generally circular lower rim. The cup 51 defines a space therein with the lower rim of the perimeter side wall defining an opening into the space of the cup. The upper portion of the cup is coupled to the distal portion of the top plate such that the opening into the space of the cup faces the circular portion of the top seat. Preferably, the upper portion of the cup and the distal portion of the top plate are generally coaxial with one another.

In a preferred embodiment, the perimeter side wall of the cup is generally frusto-conical in shape such that the perimeter side wall of the cup flares outwards from the upper portion of the cup (in other words: the diameter defined by the perimeter side wall increases from the upper portion of the cup to the lower rim of the perimeter side wall). The lower rim of the perimeter side wall preferably has an annular reinforcing lip 53 extending radially outwards therearound. The reinforcing lip 53 has a circular transverse cross section taken in a generally vertical plane. In use, the reinforcing lip is designed for providing additional structural strength to the lower rim of the perimeter side wall so that the perimeter side wall of the cup does break or fail from pressure applied from inside the space of the cup outwardly on the perimeter side wall.

A biasing member 54 is positioned between the circular portion of the top seat of the platform or the top plate of the hanger member and the upper portion of the cup. The biasing member biases the platform and the top plate of the hanger member away from one another in a generally vertical direction. The biasing member may comprise a variety of devices including an inflated air bag, a coiled spring, and a compression spring. The biasing member is rested on the circular portion of the top seat of the platform and is extended through the opening into the space of the cup.

Preferably, the biasing member comprises a two-stage biasing member having first and second portions 55,56. The first and second portions of the two-stage biasing member each have a compression resistance for resisting compression in a generally vertical direction between the top plate of the hanger member and the top seat of the platform. The compression resistance of the first portion is less than the compression resistance of the second portion such that the second portion of the two-stage biasing member is stiffer than the first portion of the two-stage biasing member. Ideally, the compression resistance of the second portion is between about 10 percent and about 80 percent of the compression resistance of the first portion.

The second portion of the two-stage biasing member is rested on the circular portion of the top seat of the platform. The first portion of the two-stage biasing member is extended through the opening into the space of the cup so that the first portion of the two-stage biasing member abuts the upper portion of the cup.

In use, as the two-stage biasing member is initially compressed by forces applied in a generally vertical direction (from above from the top plate and from below from the top seat), the forces are primarily applied to compress the first portion of the two-stage biasing member. The first portion of the two-stage biasing member is primarily compressed by the compression forces until the first portion of the two-stage biasing member is forced against the perimeter side wall to substantially fill the space of the cup. When the space in the cup is filled by the first portion of the two-stage biasing member, the vertical compression force is subsequently applied to the second portion of the two-stage biasing member to further compress the second portion of the two-stage biasing member.

In practical use, when an unloaded trailer with this suspension system traverses the ground surface, the vertical forces applied to the suspension system primarily compress the first portion of the two-stage biasing member. Over severe bumps and when the trailer is supporting a load thereon, the vertical force applied to the first portion of the two-stage biasing member until it fills the cup and the remainder of the vertical forcing is applied on the second portion of the two-stage biasing member to compress the second portion of the two-stage biasing member.

Figure 6:
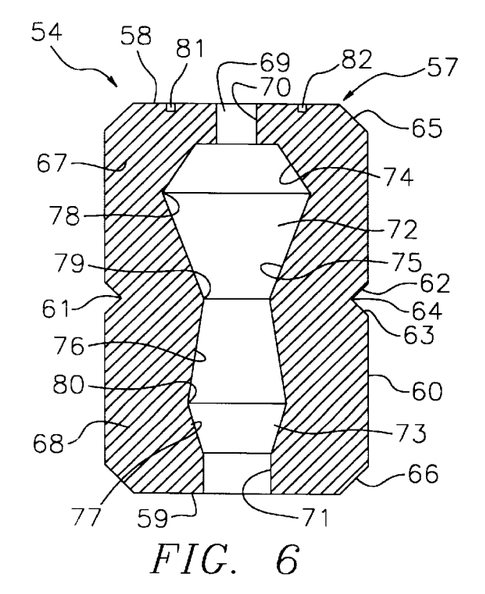
FIG. 6 is a schematic cross sectional view of a compression spring of the present invention.
Figure 7:
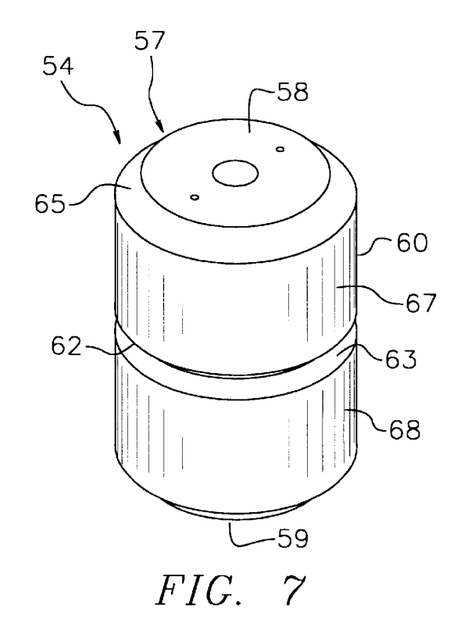
FIG. 7 is a schematic perspective view of the present invention.

Ideally, the biasing member comprises a two-stage compression spring 57. In this ideal embodiment, the compression spring comprises a resiliently elastic material that is resiliently deformable and resiliently compressible, such as a resiliently elastic rubber material. The compression spring is generally cylindrical and has generally circular top and bottom faces 58,59, a generally cylindrical side surface 60, and an axis extending between the top and bottom faces of the compression spring. In use, the compression spring is designed for compression in a generally vertical direction to provide a contrary biasing force along the vertical direction. The top and bottom faces of the compression spring preferably lie in generally parallel planes to one another. The bottom face of the compression spring is rested on the circular portion of the top seat of the platform. The top face of the compression spring is extended through the opening into the space of the cup and abuts against the upper portion of the cup. In use, it should also be noted that the compression spring may also be inverted so that the top face instead of the bottom face may be rested on the top seat of the platform.

The side surface of the compression spring has an annular channel 61 therearound. The annular channel of the compression spring divides the compression spring into generally cylindrical top and bottom portions 67,68. The top portion 67 of the compression spring is defined between the top face 58 and the annular channel 61 of the compression spring. The bottom portion 68 of the compression spring is defined between the bottom face 59 and the annular channel 61 of the compression spring. The annular channel of the compression spring generally lies in a plane substantially perpendicular to the axis of the compression spring. The annular channel is preferably positioned on the side wall of the compression spring generally equidistant between top and bottom faces of the compression spring.

The annular channel has a generally V-shaped transverse cross section taken from a vertical plane in which the axis of the compression spring lies. The transverse cross section of the annular channel has top and bottom sides 62,63 which converge together at an inner vertex 64. The top and bottom sides of the transverse cross section of the annular channel each are preferably extended at an acute angle from a horizontal plane substantially perpendicular to the axis of the compression spring in which the inner vertex lies. Ideally, the acute angles of the top and bottom sides of the transverse cross section of the annular channel are about equal to one another. In an ideal illustrative embodiment, the acute angles of the top and bottom sides of the transverse cross section of the annular channel are each about 45 degrees.

The compression spring also preferably has an annular top beveled edge 65 around the top face of the compression spring and an annular bottom edge 66 around the bottom face of the compression spring. The top beveled edge of the compression spring is extended at an acute angle from the top face of the compression spring and the bottom beveled edge of the compression spring is extended at an acute angle from the bottom face of the compression spring. Ideally, the acute angles of the top and bottom beveled edges of the compression spring are about equal to one another. In an ideal illustrative embodiment, the acute angles of the top and bottom beveled edges of the compression spring are each about 45 degrees.

The compression spring has a length defined between the top and bottom faces of the compression spring. In the ideal illustrative embodiment, the length of the compression spring is about 9½ inches. The top and bottom faces of the compression spring each have a diameter. Preferably, the diameters of the top and bottom faces of the compression spring each are about equal to one another. In the ideal illustrative embodiment, the diameters of the top and bottom faces of the compression spring are each about 5 inches. The top and bottom portions of the compression spring each have a diameter which are each about equal to one another. In the ideal illustrative embodiment, the diameters of the top and bottom portions of the compression spring are each about 6½ inches.

The compression spring has a bore 69 therethrough extending between the top and bottom faces of the compression spring. The bore of the compression spring preferably has a longitudinal axis coaxial with the axis of the compression spring. The bore has generally cylindrical top and bottom regions 70,71 and top and bottom chambers 72,73 interposed between the top and bottom regions of the bore. The top region 70 of the bore is positioned adjacent the top face 58 of the compression spring. The bottom region 71 of the bore is positioned adjacent the bottom face 59 of the compression spring. The top chamber 72 of the bore is positioned adjacent the bottom chamber 73 of the bore with the top chamber of the bore located in the top portion 67 of the compression spring and the bottom chamber of the bore located in the bottom portion 68 of the compression spring.

The top and bottom regions of the bore each have a length defined along the longitudinal axis of the bore and a diameter defined substantially perpendicular to the longitudinal axis of the bore. Preferably, the length of the top region of the bore is greater than the length of the bottom region of the bore. Also preferably, the diameter of the bottom region of the bore is greater than the diameter of the top region of the bore. In an ideal illustrative embodiment, the length of the top region of the bore is about 1.054 inches and the length of the bottom region of the bore is about 1 inch. In this ideal embodiment, the diameter of the bottom region of the bore is about 1.25 inches and the diameter of the top region of the bore is about 1.188 inches.

The top and bottom chambers of the bore each have generally frusto-conical upper and lower sections 74,75,76, 77. The upper sections 74,76 of the top and bottom chambers each taper towards the top face of the compression spring. The lower sections 76,77 of the top and bottom chambers each taper towards the bottom face of the compression spring. The upper section 74 of the top chamber is positioned adjacent the top region 70 of the bore. The lower section 77 of the bottom chamber is positioned adjacent the bottom region 71 of the bore.

The upper and lower sections of the top chamber form an annular upper intersection 78 therebetween. The upper and lower sections of the bottom chamber form an annular lower intersection 79 therebetween. The lower section of the top chamber and the upper section of the bottom chamber form an annular middle intersection 80 therebetween. The upper, lower, and middle intersections of the bore preferably lie in substantially parallel planes extending substantially perpendicular to the longitudinal axis of the bore. The upper, lower, and middle intersections of the bore each have a diameter defined substantially perpendicular to the longitudinal axis of the bore. Preferably, the diameter of the upper intersection is greater than the diameter of the lower intersection and the diameter of the lower intersection is greater than the diameter of the middle intersection. In an ideal illustrative embodiment, the diameter of the upper intersection is about 3½ inches, the diameter of the lower intersection is about 2½ inches, and the diameter of the middle intersection is about 1¾ inches.

The upper and lower sections of the top and bottom chamber each have a length defined along the longitudinal axis of the bore. In particular, the length of the upper section of the top chamber is defined between the top region of the bore and the lower section of the top chamber. The length of the lower section of the top chamber is defined between the upper section of the top chamber and the top section of the bottom chamber. The length of the upper section of the bottom chamber is defined between the lower section of the top chamber and the lower section of the bottom chamber. The length of the lower section of the bottom chamber is defined between the bottom region of the bore and the upper section of the bottom chamber.

In a preferred embodiment, the length of the lower section of the top chamber is greater than the length of the upper section of the top chamber while the length of the upper section of the bottom chamber is greater than the length of the lower section of the bottom chamber. In this preferred embodiment, the length of the lower section of the bottom chamber is greater than the upper section of the top chamber. Even more preferably, the lengths of the lower section of the top chamber and the upper section of the bottom chamber are about equal to one another. The length of the upper section of the top chamber is preferably greater than both the length of the top region of the bore and the length of the bottom region of the bore. Also preferably, the length of the lower section of the top chamber is greater than the length of the bottom region of the bore.

In an ideal illustrative embodiment, the length of the upper section of the top chamber is about 1.3 inches, the length of the lower section of the top chamber is about 2.375 inches, the length of the upper section of the bottom chamber is about 2.375 inches, and the length of the lower section of the bottom chamber is about 1.375 inches.

The upper and lower sections of the top and bottom chambers each have a slope extending at an acute angle with respect to a corresponding plane extending substantially perpendicular to the longitudinal axis of the bore. Preferably, the acute angle of the lower section 75 of the top chamber is greater than the acute angle of the upper section 74 of the top chamber. Conversely, the acute angle of the upper section 76 of the bottom chamber is preferably greater than the acute angle of the lower section 77 of the bottom chamber. Also preferably, the acute angles of both the upper and lower sections 76,77 of the bottom chamber are greater than the acute angle of the lower section 76 of the top chamber.

In an ideal illustrative embodiment, the acute angle of the upper section of the top chamber is about 60 degrees and the acute angle of the lower section of the top chamber is about 70 degrees. In this ideal illustrative embodiment, the acute angle of the upper section of the bottom chamber is about 80 degrees and the acute angle of the lower section of the bottom chamber is about 75 degrees.

The top and bottom portions of the compression spring each has a compression resistance for resisting compression in a generally vertical direction between the top and bottom faces of the compression spring. The above preferred configuration of the top and bottom chambers of the bore of the compression spring causes the compression resistance of the top portion to be less than the compression resistance of the bottom portion. This configuration makes the bottom portion of the compression spring stiffer than the upper portion of the compression spring. Ideally, the compression resistance of the bottom portion is between about 10 percent and about 80 percent of the compression resistance of the top portion.

In use, the top portion 67 of the compression spring is compressed by forces applied in a generally vertical direction (from above the top face and below the bottom face of the compression spring, i.e., from the top plate and the top seat). Because of the lower compression resistance of the top portion of the compression spring, the vertical forces on the compression spring are initially primarily applied on the top portion of the compression spring until the top portion of the compression spring is forced against the perimeter side wall to substantially fill the space of the cup.

When the space in the cup is filled by the top portion of the compression spring, the vertical force on the compression spring is subsequently increasingly applied to the bottom portion of the compression spring to further compress the bottom portion of the compression spring. When used on an unloaded trailer, the top portion should primarily absorb the shocks on the axle of the trailer as the trailer traverses the ground. This allows the suspension system 10 to provide a smooth ride even when the trailer is unloaded in contrast to a conventional leaf spring suspension where the suspension becomes less effective when not supporting a heavy load.

A upper fastener 83 is threaded extended through the center aperture of the distal portion of the top plate and through the upper portion of the cup and into the top region of the bore of the compression spring to help hold the top face of the compression spring in place in the cup. Optionally, the top face of the compression spring may have a pair of holes 81,82 therein. The top region of the bore of the compression spring is interposed between the holes of the top face of the compression spring. In this optional embodiment, the upper portion of the cup has a pair of studs inserted into the holes of the top face of the compression spring to help hold the top face of the compression spring in place in the cup.

An elongate bottom tube 84 with open upper and lower ends is extended through the center hole 17 of the top seat. The upper end of the bottom tube is inserted into the bottom region of the bore of the compression spring while the lower end of the bottom tube is positioned adjacent to and generally coaxial with the vent hole 19 of the bottom saddle to permit passage of air in an out of the bore of the compression spring through the bottom tube. The upper end of the bottom tube preferably has a tubular upper bushing 85 coupled thereto. The tubular upper bushing is inserted into the bore of the compression spring through the bottom face of the compression spring. The tubular upper bushing and the bottom tuber are designed for helping hold the bottom face of the compression spring in place of the top seat of the platform.

Figure 3:
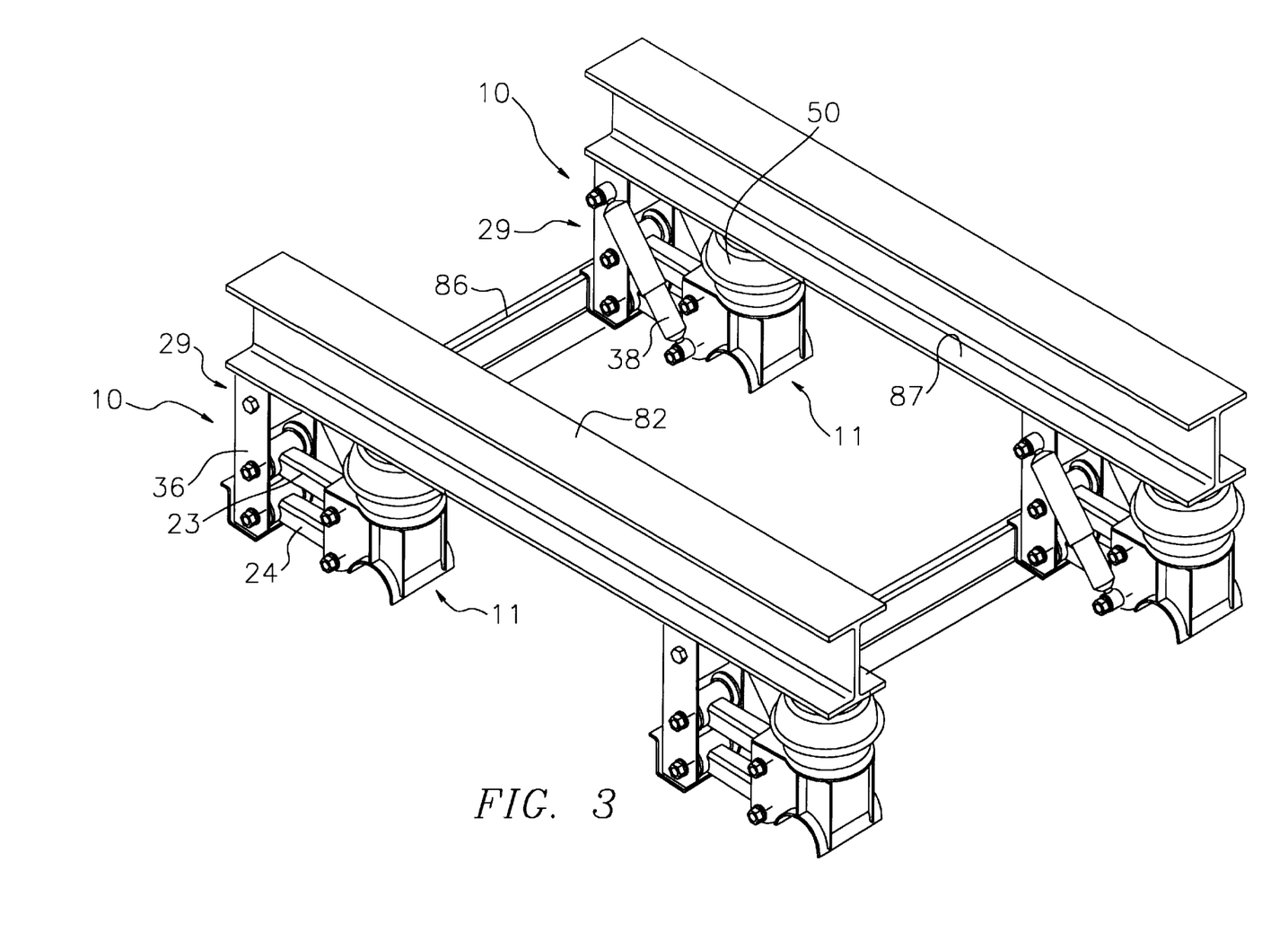
FIG. 3 is a schematic perspective view of four suspension system of the present invention mounted to a support frame of a trailer with a stabilizing bar being extended between each pair of suspension systems to provide additional structural support.

As illustrated in FIG. 3 when the suspension system is used on a trailer in tandem pairs of suspension systems mounted to each axle of the trailer, a stabilizing bar 86 may be extended between each of the suspension system of the tandem pair and coupled to the side brace of each of the suspension systems of the tandem pair for providing additional structural support by helping each of the suspension systems of the tandem pair resist lateral movement along the axle of the trailer.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A suspension system, comprising:

a platform having a top seat supported above an arcuate bottom saddle;

said bottom saddle of said platform being adapted for resting on an axle of a vehicle such that said top seat is positioned above the axle;

upper and lower pivot arms each having a pair of opposite ends and a longitudinal axis extending between said ends of the respective pivot arm;

a first end of each of said pivot arms being pivotally coupled to said platform;

a hanger member having a top plate and a side brace downwardly extending from said top plate of said hanger member;

said top plate of said hanger member having a proximal portion and a distal portion, said side brace of said hanger member being coupled to said proximal portion of said top plate;

said top plate of said hanger member being positioned above said top seat of said platform;

said top plate of said hanger member being adapted for attachment to a support frame of a trailer; and a second end of each of said pivot arms being pivotally coupled to said side brace.

2. The suspension system of claim 1, further comprising a biasing member being positioned between said top seat of said platform and said top plate of said hanger member, said biasing member biasing said platform and said top plate of said hanger member away from one another in a generally vertical direction.

3. The suspension system of claim 2, wherein said biasing member comprises an inflated air bag.

4. The suspension system of claim 2, wherein said biasing member comprises a coiled spring.

5. The suspension system of claim 2, wherein said biasing member comprises a two-stage biasing member having first and second portions, said first and second portions of said two-stage biasing member each having a compression resistance for resisting compression in a generally vertical direction between said top plate of said hanger member and said top seat of said platform, said compression resistance of said first portion being less than said compression resistance of said second portion.

6. The suspension system of claim 5, wherein said compression resistance of said second portion is between about 10 percent and about 80 percent of said compression resistance of said first portion.

7. The suspension system of claim 5, wherein said second portion of said two-stage biasing member is rested on said top seat of said platform, and wherein said first portion of said two-stage biasing member is positioned adjacent said distal portion of said top plate of said hanger member.

8. The suspension system of claim 1, wherein said upper and lower pivot arms are spaced apart from one another, and wherein said longitudinal axes of said pivot arms are extended substantially parallel to one another.

9. The suspension system of claim 1, wherein said upper and lower pivot arms each have a length defined between said ends of the respective pivot arm, said lengths of said pivot arms being about equal to one another.

10. The suspension system of claim 1, further comprising a telescopic fluidic piston cylinder actuator having first and second ends, a cylinder portion, and a piston portion telescopically inserted into said cylinder portion, said first end of said telescopic fluidic piston cylinder actuator being pivotally coupled to said side brace adjacent said top plate of said hanger member, said second end of said telescopic fluidic piston cylinder actuator being pivotally coupled to said platform.

11. The suspension system of claim 1, further comprising an inverted cup having an upper portion and a perimeter side wall downwardly extending around said upper portion of said cup, said perimeter side wall of said cup terminating at a lower rim, said cup defining a space therein, said lower rim of said perimeter side wall defining an opening into said space of said cup, said upper portion of said cup being coupled to said distal portion of said top plate such that said opening into said space of said cup faces said top seat of said platform.

12. The suspension system of claim 11, wherein said perimeter side wall of said cup is generally frusto-conical in shape such that said perimeter side wall of said cup flares outwards from said upper portion of said cup.

13. The suspension system of claim 11, wherein said lower rim of said perimeter side wall has an annular reinforcing lip extending radially outwards therearound, said reinforcing lip having a generally circular transverse cross section.

14. The suspension system of claim 11, further comprising a biasing member being positioned between said top seat of said platform and said upper portion of said cup, said biasing member biasing said platform and said top plate of said hanger member away from one another in a generally vertical direction.

15. The suspension system of claim 14, wherein said biasing member comprises a compression spring, said compression spring comprising a resiliently elastomeric material, said compression spring having top and bottom faces, a side surface, and an axis extending between said top and bottom faces of said compression spring, said bottom face of said compression spring being rested on said circular portion of said top seat of said platform, said top face of said compression spring being extending through said opening into said space of said cup and abutting said upper portion of said cup.

16. The suspension system of claim 15, wherein said side surface of said compression spring has an annular channel therearound, said annular channel of said compression spring dividing said compression spring into top and bottom portions, said top portion of said compression spring being defined between said top face and said annular channel of said compression spring, said bottom portion of said compression spring being defined between said bottom face and said annular channel of said compression spring.

17. The suspension system of claim 16, wherein said compression spring has a bore therethrough extending between said top and bottom faces of said compression spring, said bore of said compression spring having a longitudinal axis, said bore having generally cylindrical top and bottom regions and top and bottom chambers interposed between said top and bottom regions of said bore, said top region of said bore being positioned adjacent said top face of said compression spring, said bottom region of said bore being positioned adjacent said bottom face of said compression spring, said top chamber of said bore being positioned adjacent said bottom chamber of said bore, said top chamber of said bore being located in said top portion of said compression spring, said bottom chamber of said bore being located in said bottom portion of said compression spring.

18. A suspension system, comprising:

a platform having a generally planar top seat supported above an arcuate bottom saddle;

said top seat of said platform having a generally circular portion and a generally rectangular portion outwardly extending from said circular portion of said top seat, said circular portion of said top seat having a generally circular center hole there through;

said bottom saddle having a generally semi-circular transverse cross section, said bottom saddle of said platform being adapted for resting on an axle of a vehicle such that said top seat is positioned above the axle and lies in a generally horizontal plane;

said bottom saddle having a generally circular vent hole therethrough, said vent hole of said bottom saddle being generally coaxial with said center hole of said top seat;

said platform having a spaced apart pair of side plates each coupled to said top seat and said bottom saddle of said platform;

upper and lower pivot arms each having a pair of opposite ends and a longitudinal axis extending between said ends of the respective pivot arm;

said upper and lower pivot arms being spaced apart from one another, said longitudinal axes of said pivot arms being extended substantially parallel to one another;

said upper and lower pivot arms each having a length defined between said ends of the respective pivot arm, said lengths of said pivot arms being about equal to one another;

a first end of each of said pivot arms being extended between said side plates of said platform and pivotally coupled to said side plates of said platform to permit pivoting of said pivot arms in a substantially vertical plane, said rectangular portion of said top seat of said platform being positioned towards said first ends of said pivot arms;

a hanger member having a substantially planar top plate and a side brace downwardly extending from said top plate of said hanger member, said top plate and said side brace of said hanger member lying in generally perpendicular planes to one another;

said top plate of said hanger member having a generally rectangular proximal portion and a generally circular distal portion, said side brace of said hanger member being coupled to said proximal portion of said top plate;

said distal portion of said top plate having a generally circular center aperture therethrough;

said top plate of said hanger member being positioned above said top seat of said platform, said distal portion of said top plate and said circular portion of said top seat being generally coaxial with one another, said center aperture of said top plate said center hole of said top seat being generally coaxial with one another;

said top plate of said hanger member being adapted for attachment to a support frame of a trailer;

said side brace having a spaced apart pair of side walls extending therefrom;

a second end of each of said pivot arms being extended between said side walls of said side brace and pivotally coupled to said side walls of said side brace to permit pivoting of said pivot arms in a substantially vertical plane;

a telescopic fluidic piston cylinder actuator having first and second ends, a cylinder portion, and a piston portion telescopically inserted into said cylinder portion;

said first end of said telescopic fluidic piston cylinder actuator being pivotally coupled to one of said side walls of said side brace adjacent said top plate of said hanger member;

said second end of said telescopic fluidic piston cylinder actuator being pivotally coupled to one of said side plates of said platform;

an inverted cup having a generally circular upper portion and a perimeter side wall downwardly extending around said upper portion of said cup, said perimeter side wall of said cup terminating at a generally circular lower rim, said cup defining a space therein, said lower rim of said perimeter side wall defining an opening into said space of said cup;

said upper portion of said cup being coupled to said distal portion of said top plate such that said opening into said space of said cup faces said circular portion of said top seat, said upper portion of said cup and said distal portion of said top plate being generally coaxial with one another;

said perimeter side wall of said cup being generally frusto-conical in shape such that said perimeter side wall of said cup flares outwards from said upper portion of said cup;

said lower rim of said perimeter side wall having an annular reinforcing lip extending radially outwards therearound, said reinforcing lip having a generally circular transverse cross section;

a biasing member being positioned between said circular portion of said top seat of said platform and said upper portion of said cup, said biasing member biasing said platform and said top plate of said hanger member away from one another in a generally vertical direction;

said biasing member being rested on said circular portion of said top seat of said platform and being extended through said opening into said space of said cup;

said biasing member comprising a two-stage biasing member having first and second portions, said first and second portions of said two-stage biasing member each having a compression resistance for resisting compression in a generally vertical direction between said top plate of said hanger member and said top seat of said platform, said compression resistance of said first portion being less than said compression resistance of said second portion;

said second portion of said two-stage biasing member being rested on said circular portion of said top seat of said platform; and said first portion of said two-stage biasing member being extending through said opening into said space of said cup, said first portion of said two-stage biasing member abutting said upper portion of said cup.

19. The suspension system of claim 18 wherein said compression resistance of said second portion of said two-stage biasing member is between about 10 percent and about 80 percent of said compression resistance of said first portion of said two-stage biasing member.

20. A suspension system, comprising:

a platform having a generally planar top seat supported above an arcuate bottom saddle;

said top seat of said platform having a generally circular portion and a generally rectangular portion outwardly extending from said circular portion of said top seat, said circular portion of said top seat having a generally circular center hole therethrough;

said bottom saddle having a generally semi-circular transverse cross section, said bottom saddle of said platform being adapted for resting on an axle of a vehicle such that said top seat is positioned above the axle and lies in a generally horizontal plane;

said bottom saddle having a generally circular vent hole therethrough, said vent hole of said bottom saddle being generally coaxial with said center hole of said top seat;

said platform having a spaced apart pair of side plates each coupled to said top seat and said bottom saddle of said platform;

upper and lower pivot arms each having a pair of opposite ends and a longitudinal axis extending between said ends of the respective pivot arm;

said upper and lower pivot arms being spaced apart from one another, said longitudinal axes of said pivot arms being extended substantially parallel to one another;

said upper and lower pivot arms each having a length defined between said ends of the respective pivot arm, said lengths of said pivot arms being about equal to one another;

a first end of each of said pivot arms being extended between said side plates of said platform and pivotally coupled to said side plates of said platform to permit pivoting of said pivot arms in a substantially vertical plane, said rectangular portion of said top seat of said platform being positioned towards said first ends of said pivot arms;

a hanger member having a substantially planar top plate and a side brace downwardly extending from said top plate of said hanger member, said top plate and said side brace of said hanger member lying in generally perpendicular planes to one another;

said top plate of said hanger member having a generally rectangular proximal portion and a generally circular distal portion, said side brace of said hanger member being coupled to said proximal portion of said top plate;

said distal portion of said top plate having a generally circular center aperture therethrough;

said top plate of said hanger member being positioned above said top seat of said platform, said distal portion of said top plate and said circular portion of said top seat being generally coaxial with one another, said center aperture of said top plate said center hole of said top seat being generally coaxial with one another;

said top plate of said hanger member being adapted for attachment to a support frame of a trailer;

said side brace having a spaced apart pair of side walls extending therefrom;

a second end of each of said pivot arms being extended between said side walls of said side brace and pivotally coupled to said side walls of said side brace to permit pivoting of said pivot arms in a substantially vertical plane;

a telescopic fluidic piston cylinder actuator having first and second ends, a cylinder portion, and a piston portion telescopically inserted into said cylinder portion;

said first end of said telescopic fluidic piston cylinder actuator being pivotally coupled to one of said side walls of said side brace adjacent said top plate of said hanger member;

said second end of said telescopic fluidic piston cylinder actuator being pivotally coupled to one of said side plates of said platform;

an inverted cup having a generally circular upper portion and a perimeter side wall downwardly extending around said upper portion of said cup, said perimeter side wall of said cup terminating at a generally circular lower rim, said cup defining a space therein, said lower rim of said perimeter side wall defining an opening into said space of said cup;

said upper portion of said cup being coupled to said distal portion of said top plate such that said opening into said space of said cup faces said circular portion of said top seat, said upper portion of said cup and said distal portion of said top plate being generally coaxial with one another;

said perimeter side wall of said cup being generally frusto-conical in shape such that said perimeter side wall of said cup flares outwards from said upper portion of said cup;

said lower rim of said perimeter side wall having an annular reinforcing lip extending radially outwards therearound, said reinforcing lip having a generally circular transverse cross section;

a biasing member being positioned between said circular portion of said top seat of said platform and said upper portion of said cup, said biasing member biasing said platform and said top plate of said hanger member away from one another in a generally vertical direction;

wherein said biasing member comprises a compression spring, said compression spring comprising a resiliently elastomeric material, said compression spring being generally cylindrical and having generally circular top and bottom faces, a generally cylindrical side surface, and an axis extending between said top and bottom faces of said compression spring;

said top and bottom faces of said compression spring lying in generally parallel planes to one another;

said bottom face of said compression spring being rested on said circular portion of said top seat of said platform;

said top face of said compression spring being extending through said opening into said space of said cup and abutting said upper portion of said cup;

said side surface of said compression spring having an annular channel therearound, said annular channel of said compression spring dividing said compression spring into top and bottom portions, said top portion of said compression spring being defined between said top face and said annular channel of said compression spring, said bottom portion of said compression spring being defined between said bottom face and said annular channel of said compression spring;

said annular channel of said compression spring generally lying in a plane substantially perpendicular to said axis of said compression spring;

said annular channel being positioned on said side wall of said compression spring generally equidistant between top and bottom faces of said compression spring;

said annular channel having a generally V-shaped transverse cross section, said transverse cross section of said annular channel having top and bottom sides converging together at an inner vertex, said top and bottom sides of said transverse cross section of said annular channel each being extended at an acute angle from a plane substantially perpendicular to said axis of said compression spring in which said inner vertex lies;

wherein said acute angles of said top and bottom sides of said transverse cross section of said annular channel are about equal to one another;

said compression spring having an annular top beveled edge around said top face of said compression spring, said compression spring having an annular bottom edge around said bottom face of said compression spring;

said top beveled edge of said compression spring being extended at an acute angle from said top face of said compression spring, said bottom beveled edge of said compression spring being extended at an acute angle from said bottom face of said compression spring;

wherein said acute angles of said top and bottom beveled edges of said compression spring are about equal to one another;

said compression spring having a length defined between said top and bottom faces of said compression spring;

said top and bottom faces of said compression spring each having a diameter, said diameters of said top and bottom faces of said compression spring each being about equal to one another;

said top and bottom portions of said compression spring each having a diameter, said diameters of said top and bottom portions of said compression spring each being about equal to one another;

said compression spring having a bore therethrough extending between said top and bottom faces of said compression spring, said bore of said compression spring having a longitudinal axis coaxial with said axis of said compression spring;

said bore having generally cylindrical top and bottom regions and top and bottom chambers interposed between said top and bottom regions of said bore;

said top region of said bore being positioned adjacent said top face of said compression spring, said bottom region of said bore being positioned adjacent said bottom face of said compression spring;

said top chamber of said bore being positioned adjacent said bottom chamber of said bore, said top chamber of said bore being located in said top portion of said compression spring, said bottom chamber of said bore being located in said bottom portion of said compression spring;

said top and bottom regions of said bore each having a length defined along said longitudinal axis of said bore and a diameter defined substantially perpendicular to said longitudinal axis of said bore;

said length of said top region of said bore being greater than said length of said bottom region of said bore;

said diameter of said bottom region of said bore being greater than said diameter of said top region of said bore;

said top and bottom chambers of said bore each having generally frusto-conical upper and lower sections, said upper sections of said top and bottom chambers each tapering towards said top face of said compression spring, said lower sections of said top and bottom chambers each tapering towards said bottom face of said compression spring;

said upper section of said top chamber being positioned adjacent said top region of said bore;

said lower section of said bottom chamber being positioned adjacent said bottom region of said bore;

said upper and lower sections of said top chamber forming an annular upper intersection therebetween;

said upper and lower sections of said bottom chamber forming an annular lower intersection therebetween;

said lower section of said top chamber and said upper section of said bottom chamber forming an annular middle intersection therebetween;

said upper, lower, and middle intersections of said bore lying in substantially parallel planes extending substantially perpendicular to said longitudinal axis of said bore;

said upper, lower, and middle intersections of said bore each having a diameter defined substantially perpendicular to said longitudinal axis of said bore;

said diameter of said upper intersection being greater than said diameter of said lower intersection, said diameter of said lower intersection being greater than said diameter of said middle intersection;

said upper and lower sections of said top and bottom chamber each having a length defined along said longitudinal axis of said bore;

said length of said upper section of said top chamber being defined between said top region of said bore and said lower section of said top chamber;

said length of said lower section of said top chamber being defined between said upper section of said top chamber and said top section of said bottom chamber;

said length of said upper section of said bottom chamber being defined between said lower section of said top chamber and said lower section of said bottom chamber;

said length of said lower section of said bottom chamber being defined between said bottom region of said bore and said upper section of said bottom chamber;

said length of said lower section of said top chamber being greater than said length of said upper section of said top chamber;

said length of said upper section of said bottom chamber being greater than said length of said lower section of said bottom chamber;

said length of said lower section of said bottom chamber being greater than said upper section of said top chamber;

said lengths of said lower section of said top chamber and said upper section of said bottom chamber being about equal to one another;

said length of said upper section of said top chamber being greater than said length of said top region of said bore, said length of said upper section of said top chamber being greater than said length of said bottom region of said bore;

said length of said lower section of said top chamber being greater than said length of said bottom region of said bore;

said upper and lower sections of said top and bottom chambers each having a slope extending at an acute angle with respect to a corresponding plane extending substantially perpendicular to said longitudinal axis of said bore;

said acute angle of said lower section of said top chamber being greater than said acute angle of said upper section of said top chamber;

said acute angle of said upper section of said bottom chamber being greater than said acute angle of said lower section of said bottom chamber;

said acute angle of said upper section of said bottom chamber being greater than said acute angle of said lower section of said top chamber;

said acute angle of said lower section of said bottom chamber being greater than said acute angle of said lower section of said top chamber;

said top and bottom portions of said compression spring each having a compression resistance for resisting compression in a generally vertical direction between said top and bottom faces of said compression spring, said compression resistance of said top portion being less than said compression resistance of said bottom portion;

said top face of said compression spring having a pair of holes therein, said top region of said bore of said compression spring being interposed between said holes of said top face of said compression spring;

said upper portion of said cup having a pair of studs being inserted into said holes of said top face of said compression spring;

a threaded upper fastener being threaded extended through said center aperture of said distal portion of said top plate and through said upper portion of said cup and into said top region of said bore of said compression spring; and an elongate bottom tube having open upper and lower ends, said bottom tube being extended through said center hole of said top seat, said upper end of said bottom tube being inserted into bottom region of said bore of said compression spring, said lower end of said bottom tube being positioned adjacent to said vent hole of said bottom saddle to permit passage of air in an out of said bore of said compression spring through said bottom tube.

21. The suspension system of claim 20 wherein said compression resistance of said bottom portion of said compression spring is between about 10 percent and about 80 percent of said compression resistance of said top portion of said compression spring.

* * * * *